United States Patent
Stanzione et al.

(10) Patent No.: US 9,203,303 B2
(45) Date of Patent: Dec. 1, 2015

(54) INDUCTOR-BASED SWITCHING MODE DC-DC CONVERTER AND CONTROL METHOD THEREOF

(71) Applicant: Stichting IMEC Nederland, Eindhoven (NL)

(72) Inventors: Stefano Stanzione, Eindhoven (NL); Christinus Antonetta Paulus van Liempd, Schijndel (NL)

(73) Assignee: Stichting IMEC Nederland, Eindhoven (NL)

( * ) Notice: Subject to any disclaimer, the term of this patent is extended or adjusted under 35 U.S.C. 154(b) by 270 days.

(21) Appl. No.: 14/010,280

(22) Filed: Aug. 26, 2013

(65) Prior Publication Data

US 2014/0062443 A1   Mar. 6, 2014

(30) Foreign Application Priority Data

Aug. 31, 2012   (EP) .................................... 12182585

(51) Int. Cl.
  *G05F 1/56*       (2006.01)
  *H02M 3/156*      (2006.01)
  *H02M 3/158*      (2006.01)
  *H02M 1/00*       (2007.01)

(52) U.S. Cl.
  CPC ............ *H02M 3/156* (2013.01); *H02M 3/1588* (2013.01); *H02M 2001/0009* (2013.01); *Y02B 70/1466* (2013.01)

(58) Field of Classification Search
  CPC ................................ G05F 1/562; G05F 1/565
  USPC ......................... 323/266, 282–285, 290, 351
  See application file for complete search history.

(56) References Cited

U.S. PATENT DOCUMENTS

| | | | |
|---|---|---|---|
| 5,612,610 A | 3/1997 | Borghi et al. | |
| 7,592,294 B2 * | 9/2009 | Storck et al. | 502/353 |
| 8,299,770 B2 * | 10/2012 | Qiu et al. | 323/282 |
| 8,541,993 B2 * | 9/2013 | Notman et al. | 323/271 |

(Continued)

FOREIGN PATENT DOCUMENTS

| | | |
|---|---|---|
| EP | 1 936 792 A1 | 6/2008 |
| EP | 2 251 966 A1 | 11/2010 |
| WO | WO 2006/030361 A1 | 3/2006 |

OTHER PUBLICATIONS

Extended European Search Report dated Feb. 13, 2013 for European Patent Application No. EP 12 18 2585.5 which is the foreign priority of captioned U.S. Appl. No. 14/010,280.

*Primary Examiner* — Adolf Berhane
*Assistant Examiner* — Nusrat Quddus
(74) *Attorney, Agent, or Firm* — Knobbe Martens Olson & Bear LLP

(57) ABSTRACT

A DC-DC converter and a method of controlling an inductor-based switching-mode DC-DC converter in a discontinuous conduction mode are disclosed. In one aspect the method includes providing a DC-DC converter having a first and second switching elements, and, in each conversion cycle, first, turning on a first switching element, while maintaining a second switching element in off state, thereby increasing the current through an inductor. The method also includes detecting when a voltage signal at one connection node of the inductor reaches a first threshold value for the first time after the start of the conversion cycle, and turning on the second switching element, while maintaining the first switching element in off state, thereby decreasing the inductor current.

9 Claims, 7 Drawing Sheets

(56) References Cited

U.S. PATENT DOCUMENTS

| | | |
|---|---|---|
| 2004/0130307 A1 | 7/2004 | Dequina et al. |
| 2005/0110475 A1 | 5/2005 | Chapuis |
| 2008/0246455 A1 | 10/2008 | Chu et al. |
| 2009/0323375 A1 | 12/2009 | Galvano et al. |
| 2013/0207563 A1 * | 8/2013 | Hamamoto et al. .......... 315/210 |

* cited by examiner

INDUCTOR-BASED SWITCHING MODE DC-DC CONVERTER AND CONTROL METHOD THEREOF

CROSS REFERENCE TO PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field

The present description relates in general to the field of inductor-based switching-mode direct current-to-direct current (DC-DC) converters and more specifically to a DC-DC converter of that kind operating in a discontinuous conduction mode (DCM).

2. Description of the Related Art

Inductive DC-DC converters are typically characterized by long times in which the inductor current falls down. If the available power is very low, the converter has to work in discontinuous conduction mode, which means that for a certain interval of time the inductor current remains equal to zero. In order to prevent a current to an energy storage element connected to the DC-DC converter from becoming negative, that is, the DC-DC converter circuit takes current from that energy storage element, an inductor zero current crossing condition has to be detected.

An exemplary DC-DC converter operating in a discontinuous mode is described in U.S. Pat. No. 6,847,197, which comprises an electronic circuit for detecting a zero current condition flowing through an inductor, the entire contents of which are herein incorporated by reference. In such a DC-DC converter an inductor is charged by coupling the inductor to a voltage source for a predetermined amount of time; thereafter, the inductor is discharged by coupling the inductor to a ground until the current flowing through the inductor equals zero; and a method for detecting a zero current flowing through the inductor includes coupling the inductor to a transistor and comparing the output of that transistor to a transistor coupled to ground.

Another example of an inductor-based DC-DC converter is described in EP Patent Application 2 251 966 A1, which comprises a switch control circuit, and a switch controllable to cause the DC to DC converter to alternate between a magnetization phase in which an inductor current in the inductive component increases, and a demagnetization phase in which the inductor current decreases, the entire contents of which are herein incorporated by reference. The switch control circuit compares an inductor current to an intermediate threshold below a maximum inductor current, and compares an output voltage to a voltage threshold. The converter switches from the demagnetization phase to the magnetization phase when the inductor current has dropped below the intermediate threshold, and dependent on the output of the second comparator. This intermediate current threshold enables the conduction mode to be continuous at high loads and discontinuous at light loads.

A problem with the current state of the art inductor-based DC-DC converters is its speed, power consumption and/or precision performance in, for example, low power applications, e.g. in which the input available power can vary from a few microwatts to several milliwatts. The control circuit used in such inductor-based DC-DC converters needs to turn on and off the switches at the right time, and to improve the precision, speed and/or dynamic range in such control circuits there is still a need for high power consumption.

SUMMARY OF CERTAIN INVENTIVE ASPECTS

The following description discloses embodiments of a DC-DC converter and a method for controlling a DC-DC converter in a discontinuous conduction mode (DCM). In the disclosed embodiments, the DC-DC converter can provides a better speed, precision and/or power consumption trade-off performance.

According to one embodiment, a method of controlling an inductor-based switching-mode DC-DC converter, comprises an inductor, a first switching element and a second switching element, the switching elements being operationally coupled to the inductor so that the inductor is charged and completely discharged in each conversion cycle thereby operating the DC-DC converter in a discontinuous conduction mode, and the method comprising: in each conversion cycle, first, turning on the first switching element, while maintaining the second switching element in off state, thereby increasing the current through the inductor; second, turning off the first switching element, while maintaining the second switching element in off state; third, detecting when a voltage signal at one connection node of the inductor reaches a first threshold value for the first time after the start of the conversion cycle, and triggered by the first threshold value detection, turning on the second switching element, while maintaining the first switching element in off state, thereby decreasing the current through the inductor; fourth, detecting when the voltage signal reaches a second threshold value, and triggered by the second threshold value detection, turning off the second switching element, while maintaining the first switching element in off state; and fifth, maintaining the first and the second switching element in off state until the end of the conversion cycle.

Advantageously, according to one embodiment, a method of controlling an inductor-based switching-mode DC-DC converter makes use of the knowledge about the behavior of the inductor voltage, so that the switching elements can be turned on and off based on a precise detection of the inductor voltage reaching a certain first and second threshold value. Advantageously, the detection can take in consideration the specific signal characteristics of the inductor voltage when reaching a first and a second threshold value in a first and a second inductor voltage signal transition event respectively.

According to another embodiment, the method of controlling the DC-DC converter, further comprises, after detecting when the inductor voltage signal reaches a second threshold value, and triggered by the second threshold value detection, detecting when the inductor voltage signal reaches a third threshold value, and triggered by the third threshold value detection, turning off the second switching element, while maintaining the first switching element in off state. Advantageously this allows further precision for turning off the second switching element based on the specific characteristics of a second inductor voltage signal transition event.

According to another aspect, there is provided an inductor-based switching-mode DC-DC converter comprising an inductor, a first switching element and a second switching element, the switching elements being operationally coupled to the inductor so that the inductor is charged and completely discharged in each conversion cycle thereby operating the DC-DC converter in a discontinuous conduction mode, and further comprising switch control circuitry controlling the turn-on and turn-off period of the first and the second switching element so as to cause the DC-DC converter to operate in a discontinuous conduction mode in which an inductor is charged and completely discharged in each conversion cycle, wherein, the switch control circuitry is configured to, in each conversion cycle, first, turn on the first switching element, while maintaining the second switching element in off state, in order to cause the current through the inductor to increase; second, turn off the first switching element, while maintaining the second switching element in off state; third, detect when a voltage signal at one connection node of the inductor reaches a first threshold value for the first time after the start of the conversion cycle, and triggered by the first threshold value detection, turn on the second switching element, while maintaining the first switching element in off state, in order to cause the current through the inductor to decrease; fourth, detect when the voltage signal, after reaching the first threshold value, reaches a second threshold value, and triggered by the second threshold value detection, turn off the second switching element, while maintaining the first switching element in off state; and fifth, maintain the first and the second switching element in off state until the end of the conversion cycle.

According to still another embodiment, the switch control circuitry may comprise two signal transition event detection circuits: a first signal transition event detection circuit comprising a first comparator circuit and configured to detect when the voltage signal reaches the first threshold value for the first time after the start of the conversion cycle; a second signal transition event detection circuit comprising a second comparator circuit and configured to detect when the voltage signal reaches the second threshold value; and the first and the second signal transition event detection circuits being so configured to, triggered by the first threshold value detection, turn on the second switching element, and triggered by the second threshold value detection, turn off the second switching element. Advantageously, by using two different comparator circuits optimized for detecting independently a first and a second inductor voltage transition signal event, overall system efficiency is increased and power consumption is reduced.

According to still another embodiment the switch control circuitry may be further configured to, after detecting when the voltage signal reaches a second threshold value, and triggered by the second threshold value detection, detect when the voltage signal reaches a third threshold value, and triggered by the third threshold value detection, turn off the second switching element, while maintaining the first switching element in off state. The switch control circuitry may comprises, for example, two signal transition event detection circuits: a first signal transition event detection circuit comprising a first comparator circuit and configured to detect when the voltage signal reaches the first threshold value for the first time after the start of the conversion cycle; and a second signal transition event detection circuit comprising a second and a third comparator circuit, the second comparator circuit adapted for detecting when the voltage signal reaches the second threshold value and the third comparator circuit adapted for detecting when the voltage signal reaches the third threshold value; and the first and the second signal transition event detection circuits being so configured to, triggered by the first threshold value detection, turn on the second switching element, and triggered by the second and third threshold value detection, turn off the second switching element. Advantageously, by using two comparator circuits for detecting an inductor voltage second signal transition event, overall system efficiency can be increased and power consumption can be further decreased.

According to another embodiment, the first signal transition event detection circuit may be configured to activate the first comparator circuit for a period of time between the moment in which the first switching element is turned off and the moment of the first threshold value detection, and the second signal transition event detection circuit may be configured to activate the second comparator circuit for a period of time between the moment of the first threshold value detection and the moment in which the second switching element is turned off. Further, the first signal transition event detection circuit may configured to activate the first comparator circuit for a period of time between the moment in which the first switching element is turned off and the moment of the first threshold value detection, and the second signal transition event detection circuit is configured to activate the second comparator circuit for a period of time between the moment of the first threshold value detection and the moment in which the second switching element is turned off, and activate the third comparator circuit for a period of time between the moment of the second threshold value detection and the moment in which the second switching element is turned off. Advantageously, by precisely activating the comparator circuits at the time they need to do the detection, reduces overall power consumption.

According to one embodiment of a DC-DC converter, the first, the second or the third threshold values is either a voltage value of zero or a value close to zero designed to take internal circuit operating delays into account. According to another embodiment of a DC-DC converter, the first, the second or the third threshold values is either a voltage value equal to the value of the output voltage signal of the DC-DC converter or a value close to the value of the output voltage signal designed to takes internal circuit operating delays into account. Advantageously, the invention can be used with both step-up and step-down DC-DC converters.

The description also relates to an electronic system comprising a DC-DC converter according to any of the embodiments of the invention.

Certain objects and advantages of various inventive aspects have been described above. It is to be understood that not necessarily all such objects or advantages may be achieved in accordance with any particular embodiment. Those skilled in the art will recognize that the invention may be embodied or carried out in a manner that achieves or optimizes one advantage or group of advantages without necessarily achieving other objects or advantages as may be taught or suggested herein.

BRIEF DESCRIPTION OF THE DRAWINGS

The accompanying drawings illustrate one or more exemplary embodiment(s) of the present disclosure and, together with the description, further serve to explain the principles and to enable a persona skilled in the art to make and use of the invention.

DETAILED DESCRIPTION

In the following, it should be appreciated that in the description of exemplary embodiments, various features are sometimes grouped together in a single embodiment, figure, or description thereof for the purpose of streamlining the disclosure and aiding in the understanding of one or more of the various inventive aspects. This is however not to be interpreted as the invention requiring more features than the ones expressly recited in each claim, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those skilled in the art. In the description of the embodiments, numerous specific details are set forth. However, it is understood that embodiments of the invention may be practiced without these non-essential specific details. In other instances, well-known methods, structures and techniques have not been shown in detail in order not to obscure the understanding of this description.

Figure 1:
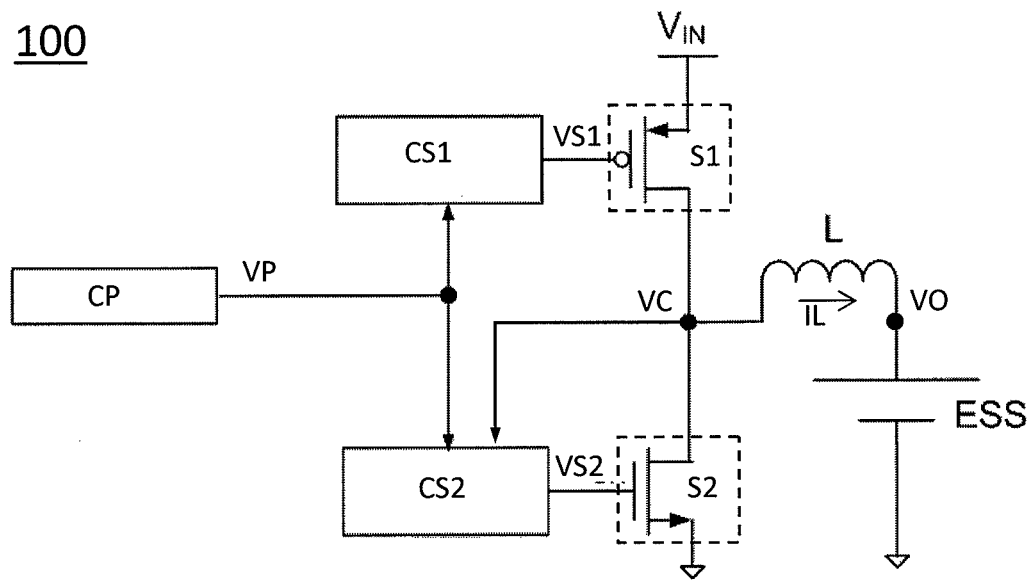
FIG. 1 shows a schematic general block diagram of a first exemplary embodiment of a DC-DC converter circuit.

FIG. 1 shows a general block diagram of a first exemplary embodiment of a DC-DC converter circuit 100, comprising a pulse generation circuit CP which provides a pulse signal VP, a first switch control circuit CS1 which provides a first switch control signal VS1 to a first switching element S1, a second switch control circuit CS2 which provides a second switch control signal VS2 to a second switching element S2. The DC-DC converter circuit 100 may receive an input voltage signal VIN and may provide an output voltage signal VO to an energy storage element ESS connected to the circuit by an inductor L. An inductor current IL may circulate through the inductor L and change in value depending on an inductor voltage signal VC. It shall be understood that the DC-DC converter circuit 100 according to certain embodiments may not comprise all the elements showed in FIG. 1 and that some of the shown elements and/or signals may be external and/or provided to the DC-DC converter circuit 100. It shall be also understood that although the switch control functionality has been split in different circuits for clarity purposes, a plurality of switch control circuits comprising whole or part of the functionality of the first switch control circuit CS1, and/or the second switch control circuit CS2 and/or the pulse generation circuit CP can be envisaged as embodiments of the present disclosure and of the DC-DC converter circuit 100.

According to an embodiment, the DC-DC converter circuit 100 of FIG. 1 has a topology of a step-down DC-DC converter, also known as a buck converter, which converts a certain DC input voltage signal $V_{IN}$ to a certain lower DC output voltage signal VO. The first switch control circuit CS1 controls the turn-on and turn-off period of the first switching element S1 by means of the first switch control signal VS1. The second switch control circuit CS2 controls the turn-on and turn-off period of the second switching element S2 by means of the second switch control signal VS2. The first and the second switch control circuits CS1, CS2 are configured to turn on and off the first and the second switching elements S1, S2 respectively, so that the inductor L is charged during a certain first period of time and discharged into the energy storage element ESS during a certain second period of time. In that manner, the energy storage element ESS, which may be, for example a battery, can be charged by the DC-DC converter circuit 100. According to an embodiment, the DC-DC converter circuit 100 of FIG. 1 is configured to operate in discontinuous conduction mode so that the inductor L is completely discharged and the inductor current IL falls to zero.

The pulse generation circuit CP may be, for example, an oscillator circuit or any electronic circuit that generates a pulse-like voltage or digital signal VP, which is used to define the start and the end of the conversion cycle and is used by the first and the second switch control circuits CS1, CS2 to drive the switching elements S1, S2. The oscillator circuit may be, for example, a low power relaxation oscillator, which can be designed based on charging and discharging a single or a plurality of capacitors. A precise and low power relaxation oscillator for generating an impulse signal of variable width and period can be designed based on charging a first capacitance with a first current and discharging a second capacitance with a second current.

According to an embodiment, the first switching element S1 may be a pMOS transistor and the second switching element S2 may be a nMOS transistor, but it shall be understood that other equivalent switching elements or switches may be used instead which can be turned on and off in order to electrically connect and disconnect respectively a certain connection point to another. Such switching elements may include electromechanical or electrical switches.

According to an embodiment, when the digital pulse signal VP transitions to an active state, e.g. a digital "1" voltage, indicating the start of a new conversion cycle, the first switch control circuit CS1 generates a first switch control signal VS1 that turns on (or closes, in order to conduct) the first switching element S1, while the second switching element S2 is maintained in an off state (or open or not conducting state). Then the inductor voltage signal VC rises to a value close to the DC value of the input voltage signal $V_{IN}$ and causes the inductor current IL to ramp up at a rate which is proportional to the value of the input voltage signal $V_{IN}$. The digital pulse signal VP may remain active during a certain period of time and when the pulse signal returns to inactive state or digital "0" voltage, the first switch control circuit CS1 generates a first switch control signal VS1 that turns off the first switching element S1 (or causing the first switching element S1 to open), while the second switch control circuit CS2 maintains the second switching element S2 in open state. The first switching element S1 will be maintained in an open or off state until the next conversion cycle starts. It shall be understood that although the above exemplary embodiment shows a first way to indicate, by means of the pulse signal VP, the start of a new conversion cycle and the turn off time of the first switching element S1, a person skilled in the art will understand that other embodiments are possible to achieve the same purpose without departing from the scope of this disclosure. For example, with more than one pulse signal, with digital or analogue signals, and considering different transitions of the pulse signal or signals.

According to an embodiment, the second switch control circuit CS2 is configured to detect specific signal transition events in which the inductor voltage signal VC reaches a threshold value close or equal to zero in each conversion cycle. Also according to an embodiment, the second switch control circuit CS2 is configured to detect two of such signal transition events in each conversion cycle. According to yet another embodiment, the second switch control circuit CS2 is configured to detect each of the two signal transition events independently. According to an embodiment, when the first switch control circuit CS1 opens the first switching element S1, while the second switching element S2 is still open, the inductor voltage signal VC falls, crossing zero, to a negative value, defining a first signal transition event TVC1 (in FIGS. 3A, B). When the second switch control circuit CS2 detects such first signal transition event TVC1 after a start of a new conversion cycle, the second switch control circuit CS2 generates a second switch control signal VS2 that turns on the second switching element S2 (or causing the second switching element S2 to close or conduct). After the second switching element S2 closes, the inductor current IL ramps down with a rate proportional to the output voltage signal VO and the value of the inductor voltage signal VC increases, reaching at a certain moment a value of zero volts, defining a second signal transition event TVC2 (in FIGS. 3A, B). The second switch control circuit CS2 keeps precisely sensing the inductor voltage signal VC so that when the second switch control circuit CS2 detects such second signal transition event TVC2 after a start of a new conversion cycle, the second switch control circuit CS2 generates a second switch control signal VS2 that turns off the second switching element S2 (or causing the second switching element S2 to open). After the second switching element S2 is opened, the second switch control circuit CS2 is configured to neglect all further transitions of the inductor voltage signal VC crossing zero or close to zero and to maintain such second switching element S2 in open state until the start of the next conversion cycle.

Figure 2:
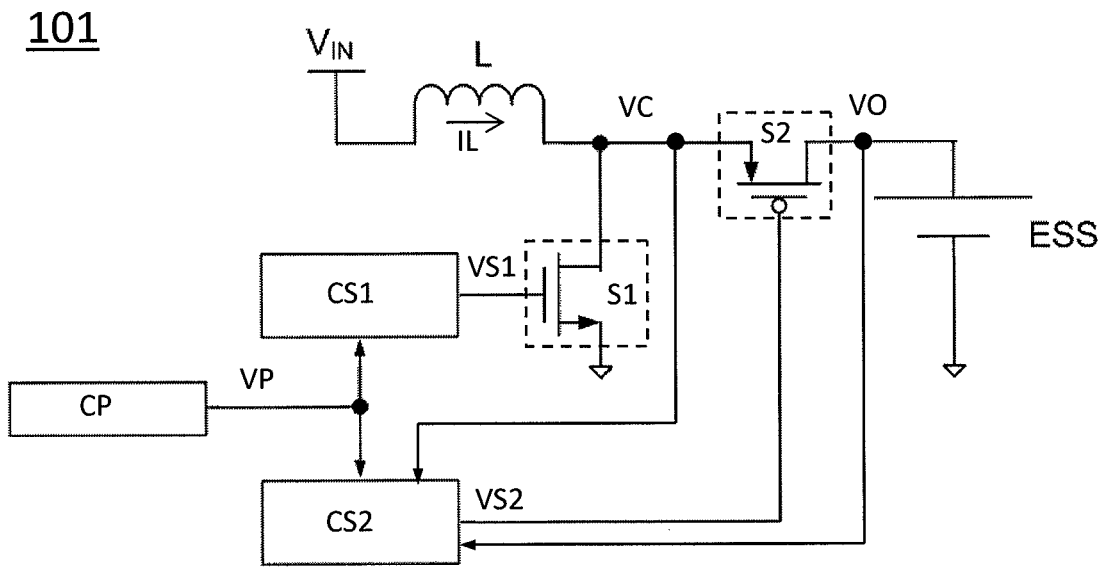
FIG. 2 shows a schematic general block diagram of a second exemplary embodiment of a DC-DC converter circuit.

FIG. 2 shows a general block diagram of a second exemplary embodiment of a DC-DC converter circuit 101, comprising a pulse generation circuit CP which provides a pulse signal VP, a first switch control circuit CS1 which provides a first switch control signal VS1 to a first switching element S1, a second switch control circuit CS2 which provides a second switch control signal VS2 to a second switching element S2. The DC-DC converter circuit 101 may receive an input voltage signal $V_{IN}$ which is connected to the circuit by an inductor L and may provide an output voltage signal VO to an energy storage element ESS. An inductor current IL may circulate through the inductor L and change in value depending on an inductor voltage signal VC. It shall be understood that the DC-DC converter circuit 101 according to certain embodiments, may not comprise all the elements showed in FIG. 2 and that some of the shown elements and/or signals may be external and/or provided to the DC-DC converter circuit 101. It shall be also understood that although the switch control functionality has been split in different circuits for clarity purposes, a plurality of switch control circuits comprising whole or part of the functionality of the first switch control circuit CS1, and/or the second switch control circuit CS2 and/or the pulse generation circuit CP can be envisaged as embodiments of the present disclosure and of the DC-DC converter circuit 101.

According to an embodiment, the DC-DC converter circuit 101 of FIG. 2 has a topology of a step-up DC-DC converter, also known as a boost converter, which converts a certain DC input voltage signal $V_{IN}$ to a certain higher DC output voltage signal VO. The first switch control circuit CS1 controls the turn-on and turn-off period of the first switching element S1 by means of the first switch control signal VS1. The second switch control circuit CS2 controls the turn-on and turn-off period of the second switching element S2 by means of the second switch control signal VS2. The first and the second switch control circuits CS1, CS2 are configured to turn on and off the first and the second switching elements S1, S2 respectively, so that the inductor L is charged during a certain first period of time and discharged into the energy storage element ESS during a certain second period of time. In that manner, the energy storage element ESS, which may be, for example a battery, can be charged by the DC-DC converter circuit 101. According to an embodiment, the DC-DC converter circuit 101 of FIG. 2 is configured to operate in discontinuous conduction mode so that the inductor L is completely discharged and the inductor current IL falls to zero.

According to an embodiment, the pulse generation circuit CP may be implemented as in the DC-DC converter circuit 100 of FIG. 1, the first switching element S1 may be a nMOS transistor and the second switching element S2 may be a pMOS transistor, but it shall be understood that other equivalent switching elements or switches may be used instead, as explained above.

According to an embodiment, when the digital pulse signal VP transitions to an active state, indicating the start of a new conversion cycle, the first switch control circuit CS1 generates a first switch control signal VS1 that turns on (or closes, in order to conduct) the first switching element S1, while the second switching element S2 is maintained in off state (or open or not conducting state). Then the inductor voltage signal VC falls to a value close to zero while the input voltage signal $V_{IN}$ causes the inductor current IL to ramp up by a rate which is proportional to that value of the input voltage signal $V_{IN}$. The digital pulse signal VP may remain active, e.g. a digital "1" voltage, during a certain period of time and when the pulse signal returns to inactive state or zero voltage the first switch control circuit CS1 generates a first switch control signal VS1 that turns off the first switching element S1 (or causing the first switching element S1 to open), while the second switch control circuit CS2 maintains the second switching element S2 in open state. The first switching element S1 will be maintained in open state until the next conversion cycle starts. It shall be understood that although the above exemplary embodiment shows a first way to indicate, by means of the pulse signal VP, the start of a new conversion cycle and the turn off time of the first switching element S1, a person skilled in the art will be able to easily derive other embodiments to achieve the same purpose, for example, with more than one pulse signal, with digital or analogue signals, and considering different transitions of the pulse signal or signals.

According to an embodiment, the second switch control circuit CS2 is configured to detect specific signal transition events in which the inductor voltage signal VC reaches a threshold value close or equal to the output voltage signal VO in each conversion cycle. Also according to an embodiment, the second switch control circuit CS2 is configured to detect two of such signal transition events in each conversion cycle. According to yet another embodiment, the second switch control circuit CS2 is configured to detect each of the two signal transition events independently. According to an embodiment, when the first switch control circuit CS1 opens the first switching element S1, while the second switching element S2 is still open, the inductor voltage signal VC rises to a value close or equal to the output voltage signal VO, defining a first signal transition event TVC1 (in FIG. 4). When the second switch control circuit CS2 detects such first signal transition event TVC1 after a start of a new conversion cycle, the second switch control circuit CS2 generates a second switch control signal VS2 that turns on the second switching element S2 (or causing the second switching element S2 to close or conduct). After the second switching element S2 closes, the inductor current IL ramps down with a rate proportional to the difference between the output voltage signal VO and the input voltage signal VIN and the value the inductor voltage signal VC decreases, reaching at a certain moment the value of the output voltage signal VO, defining a second signal transition event TVC2 (in FIG. 4). The second switch control circuit CS2 keeps precisely sensing the inductor voltage signal VC so that when the second switch control circuit CS2 detects such second signal transition event TVC2 after a start of a new conversion cycle, the second switch control circuit CS2 generates a second switch control signal VS2 that turns off the second switching element S2 (or causing the second switching element S2 to open). After the second switching element S2 is opened, the second switch control circuit CS2 is configured to neglect all further transitions of the inductor voltage signal VC close to the value of the output voltage signal VO and to maintain such second switching element S2 in open state until the next conversion cycle starts.

Figure 3A:
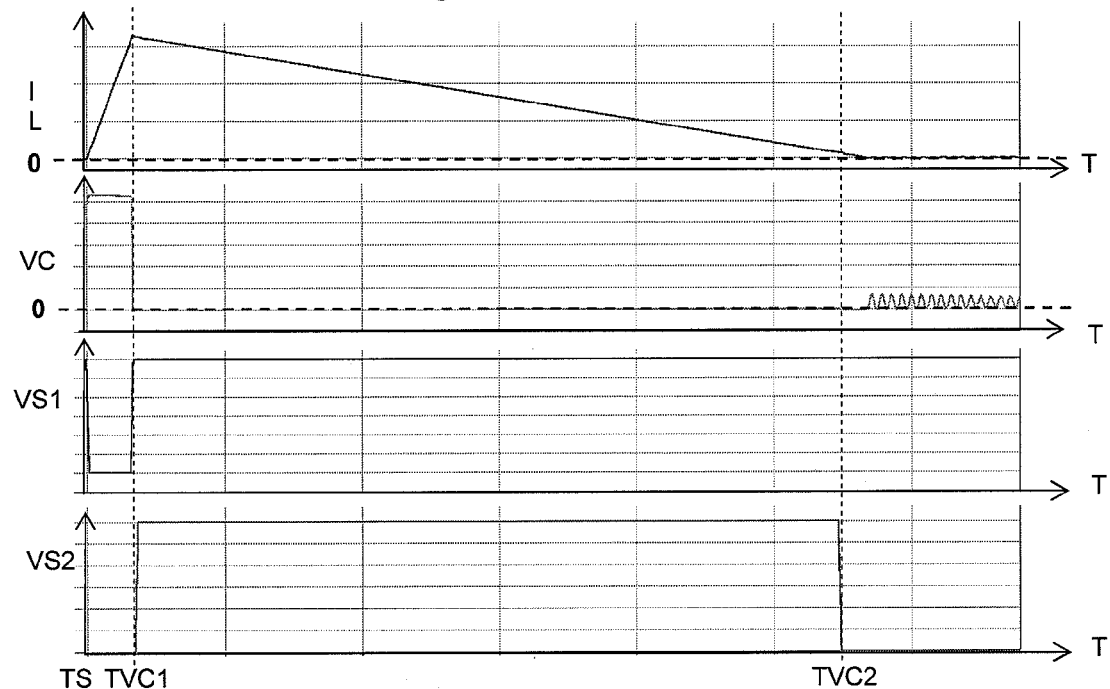
FIGS. 3A, 3B illustrate time graphs of a plurality of voltage and current signals provided in an exemplary embodiment of a DC-DC converter circuit according to FIG. 1.
Figure 3B:
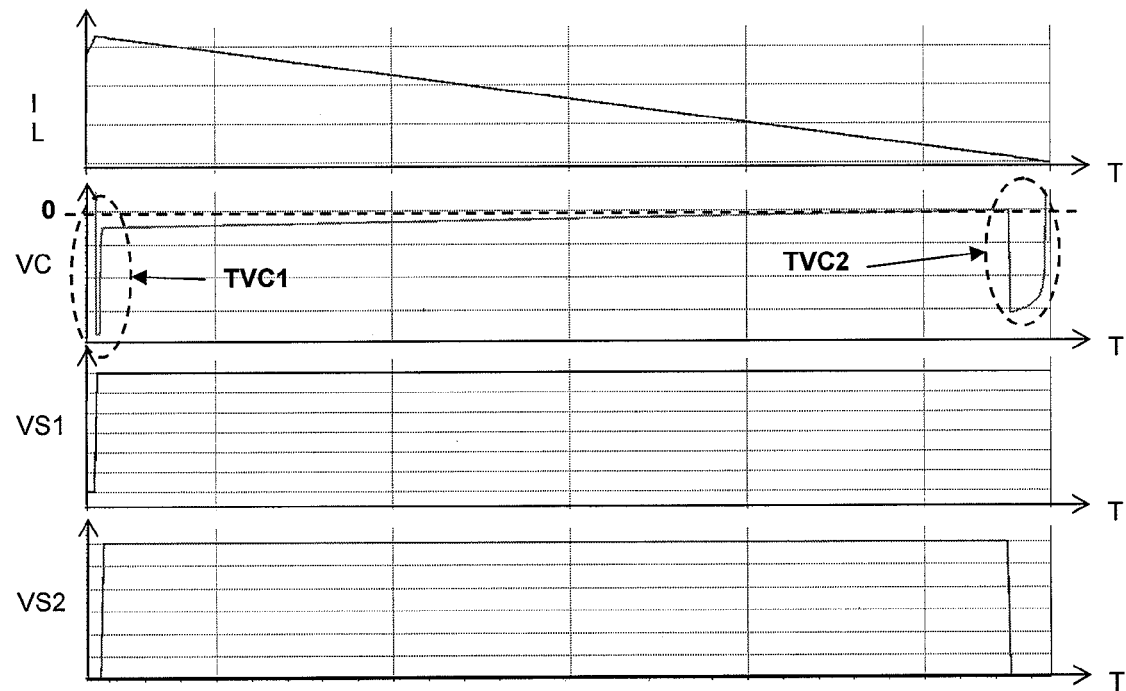

FIGS. 3A and 3B show time graphs of the inductor current IL, the inductor voltage current VC and the first and second switch control signals VS1, VS2 provided in an exemplary embodiment of a DC-DC converter circuit 100 shown in FIG. 1. FIG. 3B shows a detailed view of the specific signal transition events that are detected by the second switch control circuit CS2 according to an embodiment, namely a first signal transition event TVC1 and a second signal transition event TVC2.

According to an embodiment, the first signal transition event TVC1 occurs when the inductor voltage signal VC falls to a negative value for the first time after the start of a new conversion cycle at a cycle starting time TS. Also according to an embodiment, the second signal transition event TVC2 occurs after the first signal transition event TVC1 and in the same conversion cycle, when the inductor voltage signal VC increases and reaches the value of zero or a certain value close to zero. After the second signal transition event TVC2, the inductor voltage VC will resonate around the level of the output voltage signal VO due to the small energy which is still remaining in the inductor and which will be lost (due to parasitic losses) before the next conversion cycle starts.

As can be appreciated in FIG. 3B a first voltage signal peak of the inductor voltage signal VC below the zero value at the time of the first signal transition event TVC1 has a faster characteristic than a second voltage signal peak of the inductor voltage signal VC below the zero value at the time of the second signal transition event TVC2, that is, the two signal peaks are substantially different in terms of speed. The first negative voltage peak occurs when the inductor voltage signal node is floating and discharged by the peak current in the inductor. Typical falling times of the inductor voltage signal VC are in the order of one volt per nanosecond and depend on the total parasitic capacitance of the inductor voltage signal node. There is a small delay for second switching element S2 to close due to the speed of the detection mechanism sensing the inductor voltage signal VC. After the second switching element S2 closes, the inductor voltage signal VC becomes zero minus a voltage drop, for example 100 mV, of the second switching element S2. The falling time of the inductor current IL is proportional to the peak current and to the inverse of the voltage of the energy storage element ESS connected to the circuit. If the time period in which the first switching element S1 is closed is constant, the peak current is proportional to the difference between the input voltage signal VIN and the output voltage signal VO. Hence the falling time of the inductor current is dependent on the input and output voltages. The falling time of the inductor current is always much larger than the falling time of the inductor voltage VC. The second negative voltage peak occurs when the second switch control circuit CS2 changes the state of the second switching element S2 from closed to open. At that point the inductor current IL is still a little positive and the inductor voltage VC a little bit negative, and it will result in a negative kick back of the inductor voltage VC.

According to an embodiment, the second switch control circuit CS2 is configured to detect the first and the second signal transition events TVC1, TVC2 in each conversion cycle using independent detection mechanisms, one for detecting the first signal transition event TVC1, and another for detecting the second signal transition event TVC2.

During the first signal transition event TVC1, if the second switching element S2 is turned on too early, the charge on the parasitic capacitance seen on the inductor voltage signal node will be discharged to ground instead of recharging the energy storage element ESS. On the other hand, if the second switching element S2 is turned on too late, the inductor voltage VC would decrease below ground, causing conduction of the substrate diode, resulting in efficiency losses. During the second signal transition event TVC2, if the second switching element S2 is turned off too early, it will produce an increase of the power losses, because the substrate diode will start to conduct. On the other hand, if the second switching element S2 is turned off too late, the inductor current will start to flow from the energy storage element ESS to ground. Advantageously, according to an embodiment, the second switching element S2 is controlled by the second switch control circuit CS2 to a very precise on and off switching time.

According to an embodiment, the second switch control circuit CS2 of the DC-DC converter circuit 100 shown in FIG. 1 is configured to detect the first signal transition event TVC1 when the inductor voltage signal VC reaches a first threshold detection value, of zero or close to zero, after a new start of a conversion cycle at a cycle starting time TS. Also according to an embodiment, such second switch control circuit CS2 is configured to detect the second signal transition event TVC2 when the inductor voltage signal VC reaches a second threshold detection value, of zero or close to zero, after the first signal transition event TVC1 and in the same conversion cycle. The threshold value close to zero may be a positive or negative voltage value substantially close to zero. According to another embodiment, the threshold value close to zero is a positive or negative voltage value which is chosen considering operational delays of the second switch control circuit CS2, so that such circuit is operative when the inductor voltage signal VC reaches a certain designed value.

Figure 4:
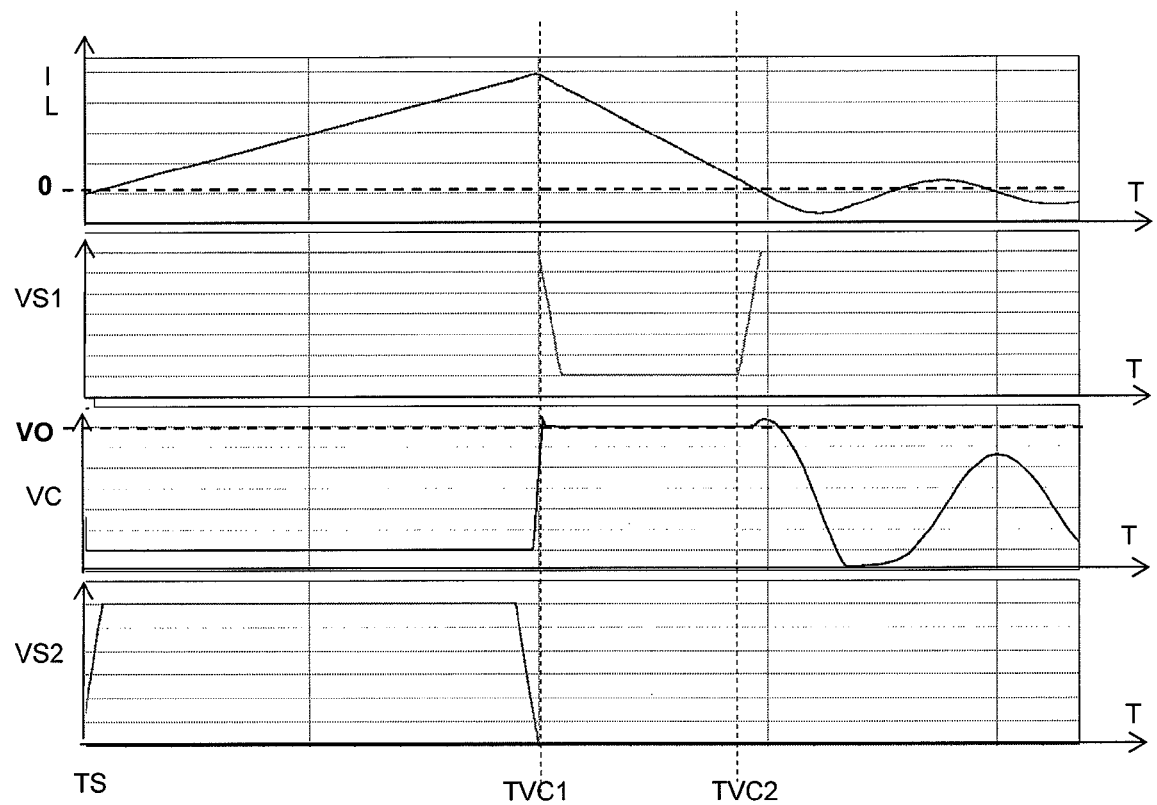
FIG. 4 illustrates time graphs of another plurality of voltage and current signals provided in an exemplary embodiment of a DC-DC converter circuit according to FIG. 2.

FIG. 4 shows time graphs of the inductor current IL, the inductor voltage signal VC and the first and second switch control signals VS1, VS2 provided in an exemplary embodiment of a DC-DC converter circuit 101 shown in FIG. 2. FIG. 4 also indicates the specific signal transition events that are detected by the second switch control circuit CS2 according to an embodiment, namely a first signal transition event TVC1 and a second signal transition event TVC2.

According to an embodiment, the first signal transition event TVC1 occurs when the inductor voltage signal VC rises and reaches a value close or equal to the output voltage signal VO for the first time after the start of a new conversion cycle at a cycle starting time TS. Also according to an embodiment, the second signal transition event TVC2 occurs after the first signal transition event TVC1 and in the same conversion cycle, when the inductor voltage signal VC decreases and reaches a value close or equal to the output voltage signal VO.

As can be appreciated in FIG. 4, a first voltage signal peak of the inductor voltage signal VC over the value of the output voltage signal VO at the time of the first signal transition event TVC1 has a faster characteristic than a second voltage signal peak of the inductor voltage signal VC over the value of the output voltage signal VO at the time of the second signal transition event TVC2. Similar to what happens in FIG. 3B, the two signal peaks are substantially different in terms of speed.

According to an embodiment, the second switch control circuit CS2 of the DC-DC converter circuit 101 shown in FIG. 2 is configured to detect the first signal transition event TVC1 when the inductor voltage signal VC reaches a first threshold detection value, being equal or close to the output voltage signal VO, for the first time after the start of a new conversion cycle at a cycle starting time TS. Also according to an embodiment, such second switch control circuit CS2 is configured to detect the second signal transition event TVC2 when the inductor voltage signal VC reaches a second threshold detection value, being equal or close to the output voltage signal VO, after the first signal transition event TVC1 and in the same conversion cycle. The threshold value close to the value of the output voltage signal VO may be a voltage value higher or lower than the value of the output voltage signal VO. According to another embodiment, the threshold value close to the value of the output voltage signal VO may be a voltage value higher or lower than the value of the output voltage signal VO which is chosen considering operational delays of the second switch control circuit CS2, so that such circuit is operative when the inductor voltage signal VC reaches a certain designed value.

Figure 5:
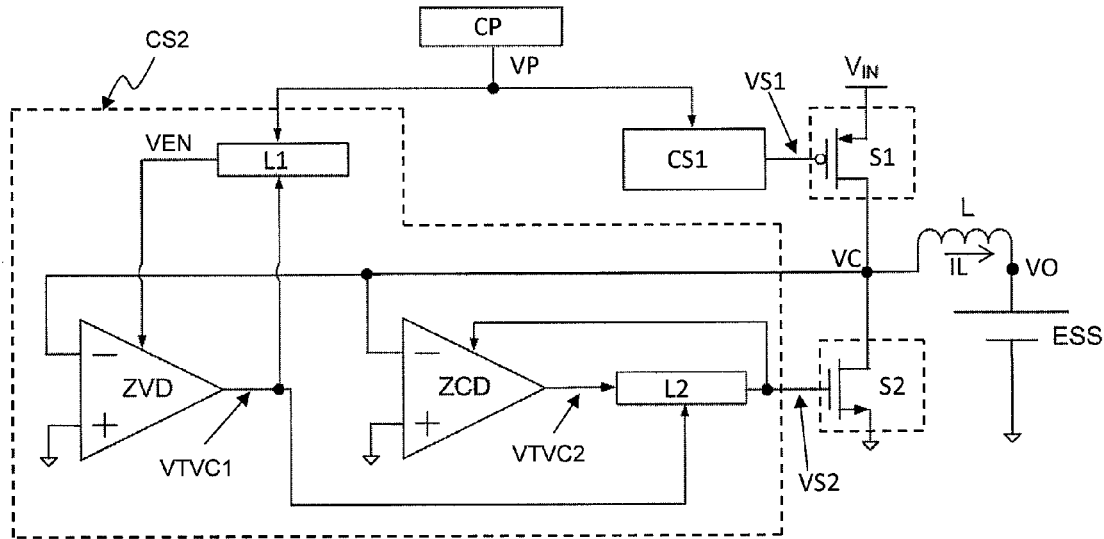
FIG. 5 shows a more detailed block diagram of an exemplary embodiment of a DC-DC converter circuit according to FIG. 1.

FIG. 5 shows a more detailed block diagram of an exemplary embodiment of a DC-DC converter circuit 100 according to FIG. 1, comprising a pulse generation circuit CP which provides a pulse signal VP, a first switch control circuit CS1 which provides a first switch control signal VS1 to a first switching element S1, a second switch control circuit CS2 which provides a second switch control signal VS2 to a second switch element S2. The DC-DC converter circuit 100 may receive an input voltage signal VIN and may provide an output voltage signal VO to an energy storage element ESS connected to the circuit by an inductor L. An inductor current IL may circulate through the inductor L and change in value depending on an inductor voltage signal VC. The second switch control circuit CS2 according to an embodiment comprises a first signal transition event detection circuit and a second signal transition event detection circuit.

According to an embodiment, the first signal transition event detection circuit comprises a first digital circuit L1 which provides an enabling signal VEN and a first comparator circuit ZVD which provides a first transition event signal VTVC1. The first digital circuit L1 receives the pulse signal VP from the pulse generation circuit CP and the first transition event signal VTVC1 from the first comparator circuit ZVD and generates the enabling signal VEN to activate/enable or deactivate/disable the first comparator circuit ZVD. For example, when the pulse signal VP has a transition from inactive to active state, e.g. from a digital "0" to "1" (the first switching element S1 is turned on), the first digital circuit L1 detects the start of a new conversion cycle and waits until the pulse signal VP has a transition from an active to an inactive, e.g. from the digital "1" to "0" (the first switching element S1 is turned off), for causing the enabling signal VEN to transition to active state (e.g. to a digital "1") in order to enable the first comparator circuit ZVD. Afterwards, when the first transition event signal VTVC1 transitions to active state (e.g. a high value voltage or a digital "1"), the first digital circuit L1 causes the enabling signal VEN to transit again to inactive state (e.g. to a digital "0") in order to disable the first comparator circuit ZVD until the start of a new conversion cycle. The first comparator circuit ZVD may be connected to a first reference voltage, which may be the voltage at the inductor voltage signal node, and to a second reference voltage or having a first threshold detection value, which may be ground or a zero voltage value or a value close to zero, the latter, for example, in case the internal delays of the circuits are taken into account, and therefore compensated for designing the threshold detection value. The first comparator circuit ZVD is configured to detect the first signal transition event TVC1 when the inductor voltage signal VC reaches the first threshold detection value for the first time after the start of a new conversion cycle. When the first comparator circuit ZVD detects the first signal transition event TVC1, it will cause the first transition event signal VTVC1 to transition to active state, e.g. to a high voltage value. Advantageously, the first signal transition event detection circuit is fast enough to follow the inductor voltage signal first signal transition event falling slope, which can be as fast as one volt per nanosecond. To limit its power consumption, the first comparator circuit ZVD is disabled immediately after it detects the first signal transition event TVC1. According to another embodiment, the first comparator circuit ZVD may be substituted by an inverter (e.g. for peak values of the inductor voltage VC lower than the gate breakdown voltage) or a voltage limiter followed by an inverter (e.g. for high voltage converters and the limiter being able to keep the input voltage of the inverter lower than the output voltage signal VO).

According to an embodiment, the first signal transition event detection circuit is optimized for detecting the first signal transition event TVC1. Advantageously, the first signal transition event detection circuit is able to detect the fast falling transition of the inductor voltage VC with negligible power consumption. A dedicated first signal transition event detection circuit for the first signal transition event TVC1 can be fast and low power, and does not need to be extremely precise. Even if the first comparator circuit ZVD needs to consume a lot of power to be fast, the first digital circuit L1 is used to enable the first comparator circuit ZVD only for a short period of time, between the moment in which the first switching element S1 is turned off and the moment the first comparator circuit ZVD detects the first signal transition event TVC1, which could be, for example, less than 135 nanoseconds, and for that reason the power consumption is negligible.

Also according to an embodiment, the second signal transition event detection circuit comprises a second comparator circuit ZCD which provides a second transition event signal VTVC2 and a second digital circuit L2 which provides the second switch control signal VS2. The second digital circuit L2 receives the first transition event signal VTVC1 from the first signal transition event detection circuit and the second transition event signal VTVC2 from the second comparator circuit ZCD and generates the second switch control signal VS2 to turn on or off the second switching element S2 and to activate/enable or deactivate/disable the second comparator circuit ZCD. For example, when the first transition event signal VTVC1 transitions from inactive to active state, e.g.

from a low to a high voltage value, the second digital circuit L2 causes the second switch control signal VS2 to transit to active state in order to turn on the second switching element S2 and to enable the second comparator circuit ZCD. When enabled, the second comparator circuit ZCD causes the second transition event signal VTVC2 to transit from inactive to active state, e.g. from a low to a high voltage value. Afterwards, when the second transition event signal VTVC2 transitions from an active to an inactive, e.g. from a high to a low voltage value, the second digital circuit L2 causes the second switch control signal VS2 to transit to inactive state in order to turn off the second switching element S2 and to disable the second comparator circuit ZCD. Afterwards, the second digital circuit L2 maintains the second switch control signal VS2 in inactive state (the second switching element S2 is turned off) and the second comparator circuit ZCD disabled until it receives a new rising transition (from inactive to active state) of the first transition event signal VTVC1. The second comparator circuit ZCD may be connected to a first reference voltage, which may be the voltage at the inductor voltage signal node VC, and to a second reference voltage or having a second threshold detection value, which may be ground or a zero voltage value or a value close to zero, the latter, for example, in case the internal delays of the circuits are taken into account, and therefore compensated for by designing the threshold detection value. The second comparator circuit ZCD is configured to detect the second signal transition event TVC2 when the inductor voltage signal VC reaches the second threshold detection value, after the first signal transition event detection circuit has detected the first signal transition event TVC1 and in the same conversion cycle. In case the first threshold detection value of the first signal transition event detection circuit is designed to be equal to the second threshold detection value of the second signal transition event detection circuit, for example zero volts, then the second comparator circuit ZCD can be configured to detect the second signal transition event TVC2 when the inductor voltage signal VC reaches zero volts for the second time after the start of a new conversion cycle. When the second comparator circuit ZCD detects the second signal transition event TVC2, it will cause the second transition event signal VTVC2 to transition from an active to an inactive, e.g. from a high to a low voltage value.

According to an embodiment, the second signal transition event detection circuit is optimized for detecting the second signal transition event TVC2. Advantageously, the second signal transition event detection circuit is able to compare the negative inductor voltage signal value with the second threshold detection value with a reasonable speed and precision and consuming low power. A dedicated second signal transition event detection circuit for the second signal transition event TVC2 may be advantageously designed to be precise and to work for a longer period of time, for example tens of microseconds, for slower slopes of the inductor voltage VC, in order to maximize the overall efficiency. According to another embodiment, the second comparator circuit ZCD may be implemented by a level shifter followed by a comparator.

It shall be understood that although in the exemplary embodiments of FIG. 5, the first comparator circuit ZVD and the second comparator circuit ZCD are directly connected to the inductor voltage signal node VC and to ground, other voltage references that relate to the falling or rising slope of the inductor voltage signal VC and to its crossing through a certain threshold value, positive or negative, close to zero can be also used. Alternatively, the comparator circuits may be connected to ground but implemented with an intrinsic internal voltage offset.

Figure 6:
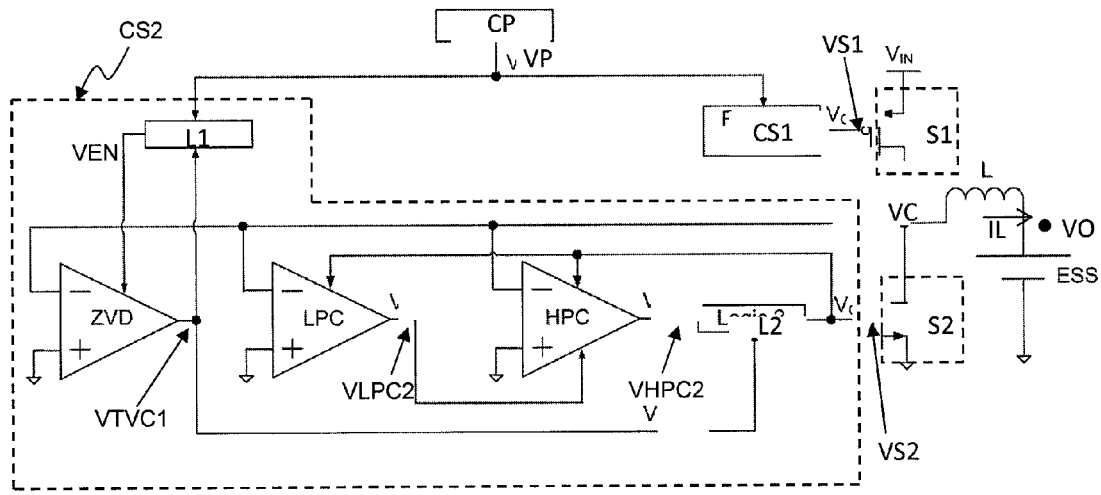
FIG. 6 shows a more detailed block diagram of another exemplary embodiment of the DC-DC converter circuit according to FIG. 1.

FIG. 6 shows a more detailed block diagram of another exemplary embodiment of a DC-DC converter circuit 100 according to FIG. 1. Its structure is the same as the one explained in the exemplary embodiment of FIG. 5, but for the fact that the second signal transition event detection circuit now comprises two different comparators, a first comparator circuit, hereinafter called a low power comparator circuit LPC, and a second comparator circuit, hereinafter called a high power comparator circuit HPC. The low power comparator circuit LPC is connected to a first reference voltage, which may be the voltage at the inductor voltage signal node VC, and to a second reference voltage or having a second threshold detection value, which may be ground or a zero voltage value or a value close to zero, the latter, for example, in case the internal delays of the circuits are taken into account, and therefore compensated for by designing a threshold detection value. As an example, the low power comparator circuit LPC may have an intrinsic internal offset voltage designed to consider the delays for turning off the second switching element S2 in all operating conditions, and thus advantageously avoiding switching delays that can cause efficiency losses. In a specific embodiment, the intrinsic internal offset voltage is proportional to the turning on time of the high power comparator circuit HPC. In an embodiment, the low power comparator circuit LPC advantageously enables the high power comparator circuit HPC a bit before the zero crossing time of the inductor voltage signal VC. In an embodiment, when the first transition event signal VTVC1 transitions from inactive to active state, e.g. from a low to a high voltage value, the second digital circuit L2 causes the second switch control signal VS2 to transit to active state in order to turn on the second switching element S2 and to enable the low power comparator circuit LPC. When enabled, the low power comparator circuit LPC causes the second transition low power event signal VLPC2, the second transition high power event signal VHPC2 and the second switch control signal VS2, to transit from inactive to active state, e.g. from a low to a high voltage value. The low power comparator circuit LPC is configured to detect the second signal transition event TVC2 when the inductor voltage signal VC reaches the second threshold detection value, after the first signal transition event detection circuit has detected the first signal transition event TVC1 and in the same conversion cycle. When the low power comparator circuit LPC detects the second signal transition event TVC2, it will cause the second transition low power event signal VLPC2 to transition from an active to an inactive, e.g. from high to a low voltage value, in order to enable the high power comparator circuit HPC. The high power comparator circuit HPC is connected to a first reference voltage, which may be the voltage at the inductor voltage signal node VC, and to a second reference voltage or having a third threshold detection value, which may be ground or a zero voltage value or a value close to zero. In an exemplary embodiment, when enabled by the low power comparator circuit LPC and when it detects that the inductor voltage signal VC reaches the third threshold detection value, it will cause the second transition high power event signal VHPC2 to transition from an active to an inactive, e.g. from a high to a low voltage value. At that time, when the second transition high power event signal VHPC2 transitions from an active to an inactive, the second digital circuit L2 causes the second switch control signal VS2 to transit to inactive state in order to turn off the second switching element S2 and to disable both the low power comparator circuit LPC and the high power comparator circuit HPC.

According to an embodiment, the second signal transition event detection circuit of FIG. 6 is optimized for detecting the second signal transition event TVC2, so that the detection is performed as precisely as possible to maximize the overall efficiency. Advantageously, the second signal transition event detection circuit comprises two different comparator circuits; one (the low power comparator circuit) that consumes low power and works for the most of the operation time, and another (the high power comparator circuit) that is more precise and consumes more power but which is operated for a shorter period of time. In this manner it is also advantageous that the detection operation of the second signal transition event TVC2 is performed with negligible effect on the efficiency of the DC-DC converter even at low input power (e.g. 10 μW).

Figure 7:
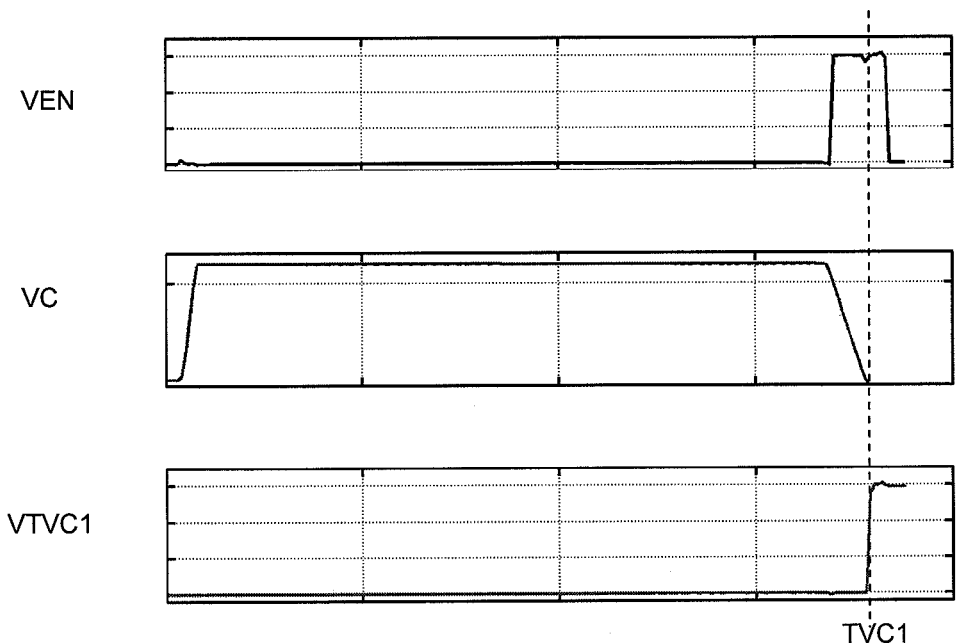
FIG. 7 illustrates time graphs of another plurality of voltage signals provided in an exemplary embodiment of a DC-DC converter circuit according to FIGS. 5 and 6.

FIG. 7 shows time graphs of the enabling signal VEN, the inductor voltage signal VC and the first transition event signal VTVC1, provided in exemplary embodiments of DC-DC converter circuits according to FIGS. 5 and 6. When the first digital circuit L1 causes the enabling signal VEN to transition to active state, the first comparator circuit ZVD is enabled, so that the first comparator circuit ZVD is able to detect the first signal transition event TVC1. After detection, the first comparator circuit ZVD causes the first transition event signal VTVC1 to transition to active state. Afterwards, when the first transition event signal VTVC1 transitions to active state, the first digital circuit L1 causes the enabling signal VEN to transit again to inactive state in order to disable the first comparator circuit ZVD until the start of a new conversion cycle.

Figure 8:
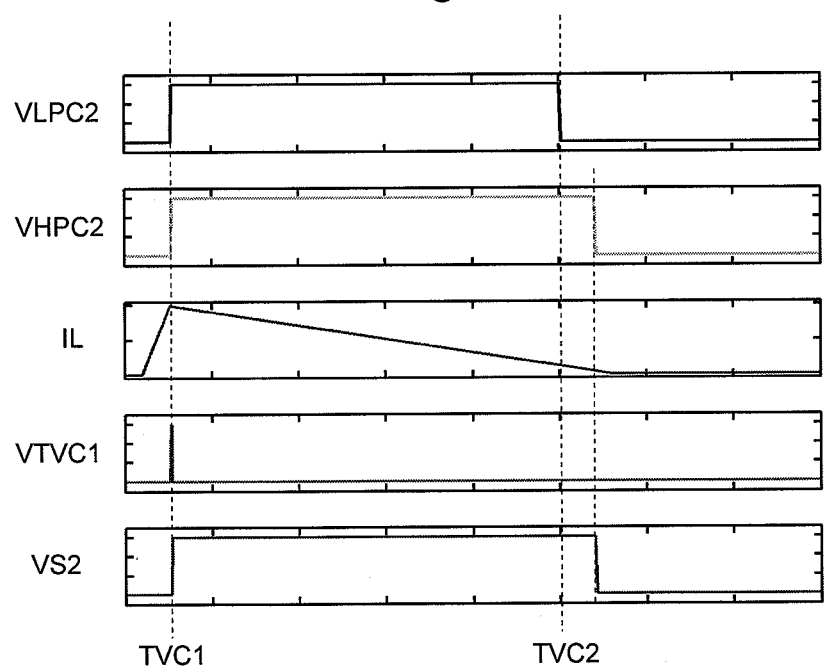
FIG. 8 illustrates time graphs of another plurality of voltage and current signals provided in an exemplary embodiment of a DC-DC converter circuit according to FIG. 6.

FIG. 8 shows time graphs of the second transition low power event signal VLPC2, the second transition high power event signal VHPC2, the inductor current IL and the first transition event signal VTVC1 and the second switch control signal VS2, provided in an exemplary embodiment of a DC-DC converter circuit according to FIG. 6. When the first signal transition event detection circuit detects the first signal transition event TVC1, and the first transition event signal VTVC1 transitions from inactive to active state, the low power comparator circuit LPC is enabled and causes the second transition low power event signal VLPC2, the second transition high power event signal VHPC2 and the second switch control signal VS2, to transit from inactive to active state. At the first transition event TVC1 the high power comparator HPC is not enabled, but its output signal VHPC2 is already preset to an active state in order to avoid missing a transition in case of fast inductor current changes. When the low power comparator circuit LPC detects the second signal transition event TVC2, it will cause the second transition low power event signal VLPC2 to transition to transition from an active to an inactive, which enables the high power comparator circuit HPC. When the high power comparator circuit HPC detects that the inductor voltage signal VC reaches the third threshold detection value, it will cause the second transition high power event signal VHPC2 and the second switch control signal VS2 to transition from an active to an inactive.

Figure 9:
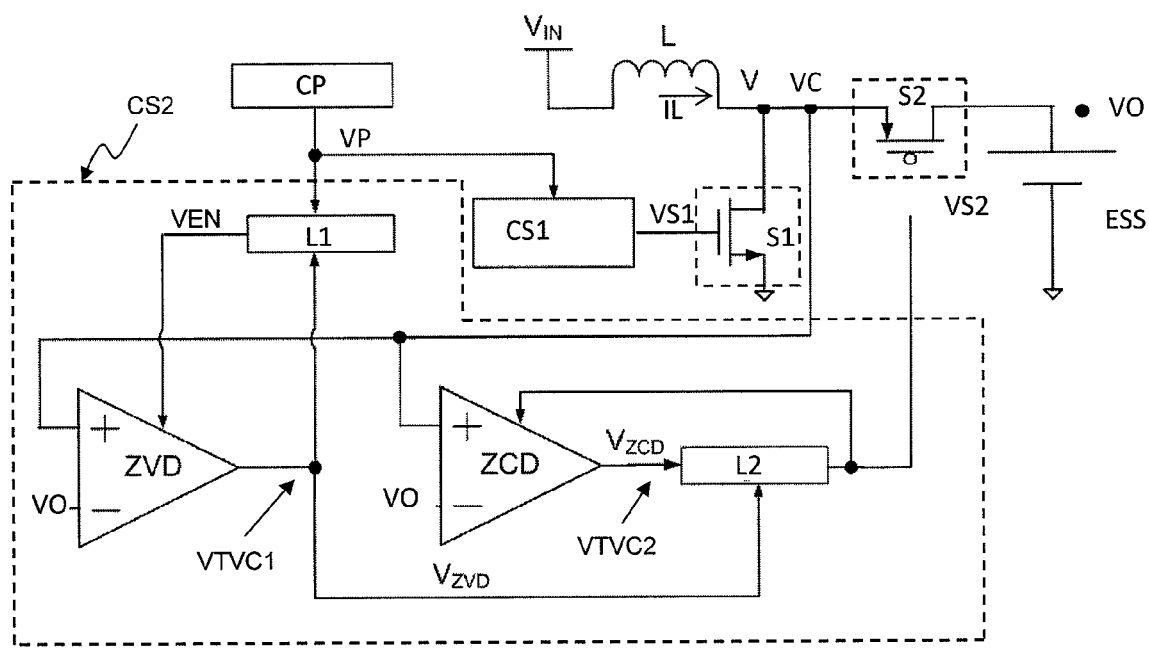
FIG. 9 shows a more detailed block diagram of an exemplary embodiment of a DC-DC converter circuit according to FIG. 2.

FIG. 9 shows a more detailed block diagram of an exemplary embodiment of a DC-DC converter circuit 101 according to FIG. 2, comprising the same structural elements as the ones explained in the exemplary embodiment of FIG. 5. It will become apparent for a person skilled in the art that the functionality of the first signal transition event detection circuit (the first digital circuit L1 and the first comparator circuit ZVD) and the second signal transition event detection circuit (the second comparator circuit ZCD and the second digital circuit L2) is similar and can be derived from the embodiments explained in FIG. 5, together with the facts explained in FIGS. 2 and 4 and particularly considering that the first threshold detection value and the second threshold detection value of the first comparator circuit ZVD and the second comparator circuit ZCD respectively, may equal or close to the value of the output voltage signal VO. The threshold value close to the value of the output voltage signal VO may be a voltage value higher or lower than the value of the output voltage signal VO, in case the internal delays of the circuits are taken into account, and therefore compensated for by designing the threshold detection value.

Figure 10:
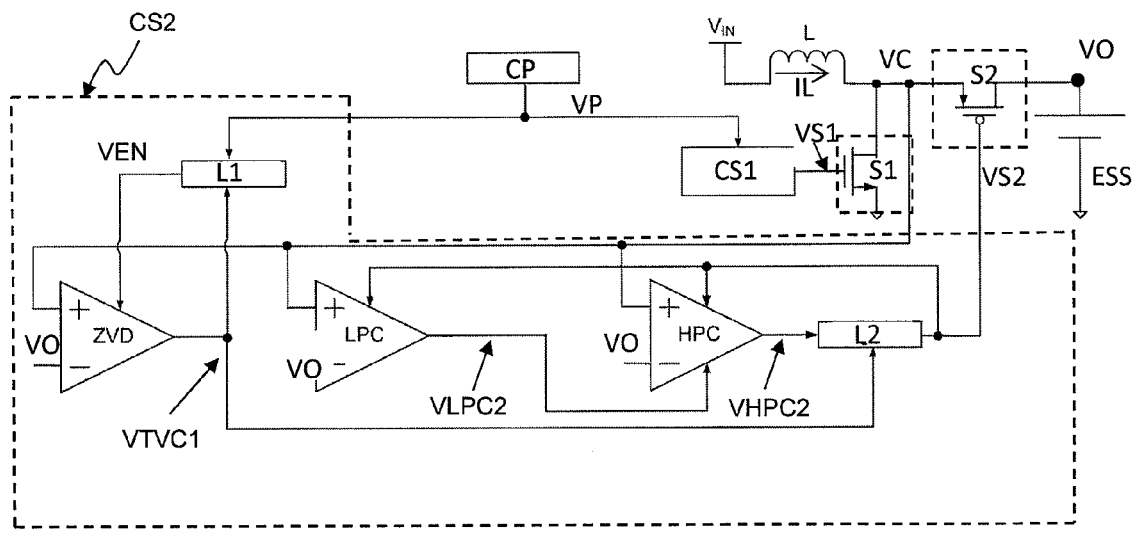
FIG. 10 shows a more detailed block diagram of another exemplary embodiment of a DC-DC converter circuit according to FIG. 2.

FIG. 10 shows a more detailed block diagram of another exemplary embodiment of a DC-DC converter circuit 101 according to FIG. 2, comprising the same structural elements as the ones explained in the exemplary embodiment of FIG. 9, but for the fact that the second signal transition event detection circuit now comprises two different comparators, a low power comparator circuit LPC and a high power comparator circuit HPC. It will become apparent for a person skilled in the art that the functionality of the first signal transition event detection circuit (the first digital circuit L1 and the first comparator circuit ZVD) and the second signal transition event detection circuit (the low power comparator circuit LPC, the high power comparator circuit HPC and the second digital circuit L2) is similar and can be derived from the embodiments explained in FIG. 6, together with the facts explained in FIGS. 2 and 4 and particularly considering that the first threshold detection value, the second threshold detection value and the third threshold detection value of the first comparator circuit ZVD, the low power comparator circuit LPC and the high power comparator circuit HPC respectively, may equal or close to the value of the output voltage signal VO. The threshold value close to the value of the output voltage signal VO may be a voltage value higher or lower than the value of the output voltage signal VO, in case the internal delays of the circuits are taken into account, and therefore compensated for by designing the threshold detection value.

The DC-DC converters according to any of the embodiments herein described may be used, but not limited to, for ultra-low power wireless sensing applications, as interface between energy harvesters and a battery element that is charged and stores the energy obtained from the harvester. The DC-DC converters according to one or more of the embodiments herein described may be advantageously efficient for low input powers between 10 and 1000 microwatts and for a large input voltage range between 5 and 60 V. The DC-DC converters works in Discontinuous Conduction Mode (DCM) to achieve high efficiency even at low input powers. Thanks to its low power consumption and to its asynchronous implementation, the DC-DC converters work efficiently also at extremely low input powers (of the order of few microwatts) and the measured efficiency is high (61% to 91%) in a wide range of input powers (10 μW-1 mW) and input voltages (5V to 60V). The control circuits and power switches of any of the DC-DC converters according embodiments of the description can be integrated in the same integrated circuit. The inductor and a rechargeable battery may be added as discrete components.

What is claimed is:

1. A method of controlling an inductor-based switching-mode DC-DC converter comprising an inductor, a first switching element and a second switching element, the switching elements being operationally coupled to the inductor so that the inductor is charged and completely discharged in each conversion cycle thereby operating the DC-DC converter in a discontinuous conduction mode, and the method comprising:

in each conversion cycle,
- turning on the first switching element, while maintaining the second switching element in off state, thereby increasing the current through the inductor;
- turning off the first switching element, while maintaining the second switching element in off state;
- detecting when a voltage signal at one connection node of the inductor reaches a first threshold value for the first time after the start of the conversion cycle, and triggered by the first threshold value detection, turning on the second switching element, while maintaining the first switching element in off state, thereby decreasing the current through the inductor;
- detecting when the voltage signal reaches a second threshold value, and triggered by the second threshold value detection, turning off the second switching element, while maintaining the first switching element in off state;
- after detecting when the voltage signal reaches a second threshold value and triggered by the second threshold value detection, detecting when the voltage signal reaches a third threshold value, and triggered by the third threshold value detection, turning off the second switching element, while maintaining the first switching element in off state; and
- maintaining the first and the second switching element in off state until the end of the conversion cycle.

2. An inductor-based switching-mode DC-DC converter comprising an inductor, a first switching element and a second switching element, the switching elements being operationally coupled to the inductor so that the inductor is charged and completely discharged in each conversion cycle thereby operating the DC-DC converter in a discontinuous conduction mode, and further comprising switch control circuitry controlling the turn-on and turn-off period of the first and the second switching element so as to cause the DC-DC converter to operate in a discontinuous conduction mode in which an inductor is charged and completely discharged in each conversion cycle, the switch control circuitry comprising:
- two signal transition event detection circuits:
  - a first signal transition event detection circuit comprising a first comparator circuit and configured to detect when the voltage signal reaches the first threshold value for the first time after the start of the conversion cycle;
  - a second signal transition event detection circuit comprising a second comparator circuit and configured to detect when the voltage signal reaches the second threshold value; and
- wherein, the switch control circuitry is configured to, in each conversion cycle,
  - turn on the first switching element, while maintaining the second switching element in off state, in order to cause the current through the inductor to increase;
  - turn off the first switching element, while maintaining the second switching element in off state; and
  - detect when a voltage signal at one connection node of the inductor reaches a first threshold value for the first time after the start of the conversion cycle, and triggered by the first threshold value detection, turn on, via the first signal transition event detection circuit, the second switching element, while maintaining the first switching element in off state, in order to cause the current through the inductor to decrease;
  - detect when the voltage signal, after reaching the first threshold value, reaches a second threshold value, and triggered by the second threshold value detection, turn off, via the second signal transition event detection circuit, the second switching element, while maintaining the first switching element in off state; and
  - maintain the first and the second switching element in off state until the end of the conversion cycle.

3. The DC-DC converter of claim 2, wherein the switch control circuitry is further configured to, after detecting when the voltage signal reaches a second threshold value, and triggered by the second threshold value detection, detect when the voltage signal reaches a third threshold value, and triggered by the third threshold value detection, turn off the second switching element, while maintaining the first switching element in off state.

4. The DC-DC converter of claim 3, wherein the switch control circuitry comprises two signal transition event detection circuits:
- a first signal transition event detection circuit comprising a first comparator circuit and configured to detect when the voltage signal reaches the first threshold value for the first time after the start of the conversion cycle;
- a second signal transition event detection circuit comprising a second and a third comparator circuit, the second comparator circuit adapted for detecting when the voltage signal reaches the second threshold value and the third comparator circuit adapted for detecting when the voltage signal reaches the third threshold value; and
- the first and the second signal transition event detection circuits are so configured to, triggered by the first threshold value detection, turn on the second switching element, and triggered by the second and third threshold value detection, turn off the second switching element.

5. The DC-DC converter of claim 2, wherein the first signal transition event detection circuit is configured to activate the first comparator circuit for a period of time between the moment in which the first switching element is turned off and the moment of the first threshold value detection, and the second signal transition event detection circuit is configured to activate the second comparator circuit for a period of time between the moment of the first threshold value detection and the moment in which the second switching element is turned off.

6. The DC-DC converter of claim 4, wherein the first signal transition event detection circuit is configured to activate the first comparator circuit for a period of time between the moment in which the first switching element is turned off and the moment of the first threshold value detection, and the second signal transition event detection circuit is configured to activate the second comparator circuit for a period of time between the moment of the first threshold value detection and the moment in which the second switching element is turned off, and activate the third comparator circuit for a period of time between the moment of the second threshold value detection and the moment in which the second switching element is turned off.

7. The DC-DC converter according to claim 2, wherein any of the first, the second or the third threshold values is either a voltage value of zero or a value close to zero designed to take internal circuit operating delays into account.

8. The DC-DC converter according to claim 2, wherein any of the first, the second or the third threshold values is either a voltage value equal to the value of the output voltage signal of the DC-DC converter or a value close to the value of the output voltage signal designed to takes internal circuit operating delays into account.

9. An electronic system comprising a DC-DC converter according to claim 2.

* * * * *